United States Patent
Coqueret et al.

(10) Patent No.: US 10,503,383 B2
(45) Date of Patent: Dec. 10, 2019

(54) METHOD FOR CONTROLLING AN OPERATING PARAMETER OF AN ACOUSTIC APPARATUS

(71) Applicant: Devialet, Paris (FR)

(72) Inventors: Charles Coqueret, Paris (FR); Maxime Leblanc, Vitry sur Seine (FR); Pierre-Emmanuel Calmel, Le Chesnay (FR)

(73) Assignee: DEVIALET, Paris (FR)

( * ) Notice: Subject to any disclaimer, the term of this patent is extended or adjusted under 35 U.S.C. 154(b) by 223 days.

(21) Appl. No.: 15/536,755

(22) PCT Filed: Dec. 16, 2015

(86) PCT No.: PCT/EP2015/080098
§ 371 (c)(1),
(2) Date: Jun. 16, 2017

(87) PCT Pub. No.: WO2016/097058
PCT Pub. Date: Jun. 23, 2016

(65) Prior Publication Data
US 2017/0351416 A1 Dec. 7, 2017

(30) Foreign Application Priority Data
Dec. 16, 2014 (FR) ...................................... 14 62519

(51) Int. Cl.
*G06F 3/0484* (2013.01)
*G06F 3/16* (2006.01)
*G06F 3/0488* (2013.01)

(52) U.S. Cl.
CPC .......... *G06F 3/04847* (2013.01); *G06F 3/165* (2013.01); *G06F 3/04883* (2013.01)

(58) Field of Classification Search
CPC ... G06F 3/04847; G06F 3/165; G06F 3/04883
See application file for complete search history.

(56) References Cited

U.S. PATENT DOCUMENTS

| 5,542,039 A | * | 7/1996 | Brinson | ............ G06F 3/04812 345/660 |
| 5,850,531 A | * | 12/1998 | Cox | .................... G06F 3/04847 715/781 |

(Continued)

FOREIGN PATENT DOCUMENTS

| GB | 2331216 A | | 5/1999 | | |
| JP | 09198224 A | * | 7/1997 | ......... | G06F 3/04847 |
| WO | WO-2013041875 A2 | * | 3/2013 | ............ | H03G 7/002 |

OTHER PUBLICATIONS

French Patent Application No. 14 62519, Rapport de Recherche Préliminaire, Jul. 10, 2015, 3 pages.

(Continued)

*Primary Examiner* — Mandrita Brahmachari
(74) *Attorney, Agent, or Firm* — Soquel Group LLC

(57) ABSTRACT

A method for controlling an operating parameter of an acoustic apparatus, including implementing a screen displaying at least one window including a cursor able to occupy positions relative to a reference of the window, the positions representing values of the operating parameter between a minimal and a maximal value, displaying the cursor in an initial position relative to the reference representative of an initial value of the operating parameter, acquiring an elementary command from an operator, moving the cursor with respect to the reference as a function of the elementary command, from the initial position to a final position in order to select a final value of the operating parameter in a range of selectable values containing the initial value, and sending the selected value to the acoustic apparatus, wherein the range of selectable values has an amplitude strictly less than the difference between the maximum and the minimum values.

11 Claims, 1 Drawing Sheet

(56) References Cited

U.S. PATENT DOCUMENTS

| | | | |
|---|---|---|---|
| 6,061,062 A | 5/2000 | Venolia | |
| 2012/0014553 A1* | 1/2012 | Bonanno | H03G 3/341 |
| | | | 381/364 |
| 2013/0014057 A1* | 1/2013 | Reinpoldt | G06F 3/04883 |
| | | | 715/833 |
| 2013/0257912 A1* | 10/2013 | Ushioda | G06F 3/04855 |
| | | | 345/684 |
| 2013/0346915 A1* | 12/2013 | Kuehnle | G06F 3/0482 |
| | | | 715/799 |
| 2014/0152563 A1* | 6/2014 | Ouchi | G06F 3/0487 |
| | | | 345/158 |

OTHER PUBLICATIONS

PCT Application No. PCT/EP2015/080098, International Search Report, dated Feb. 10, 2016, 4 pages.

* cited by examiner

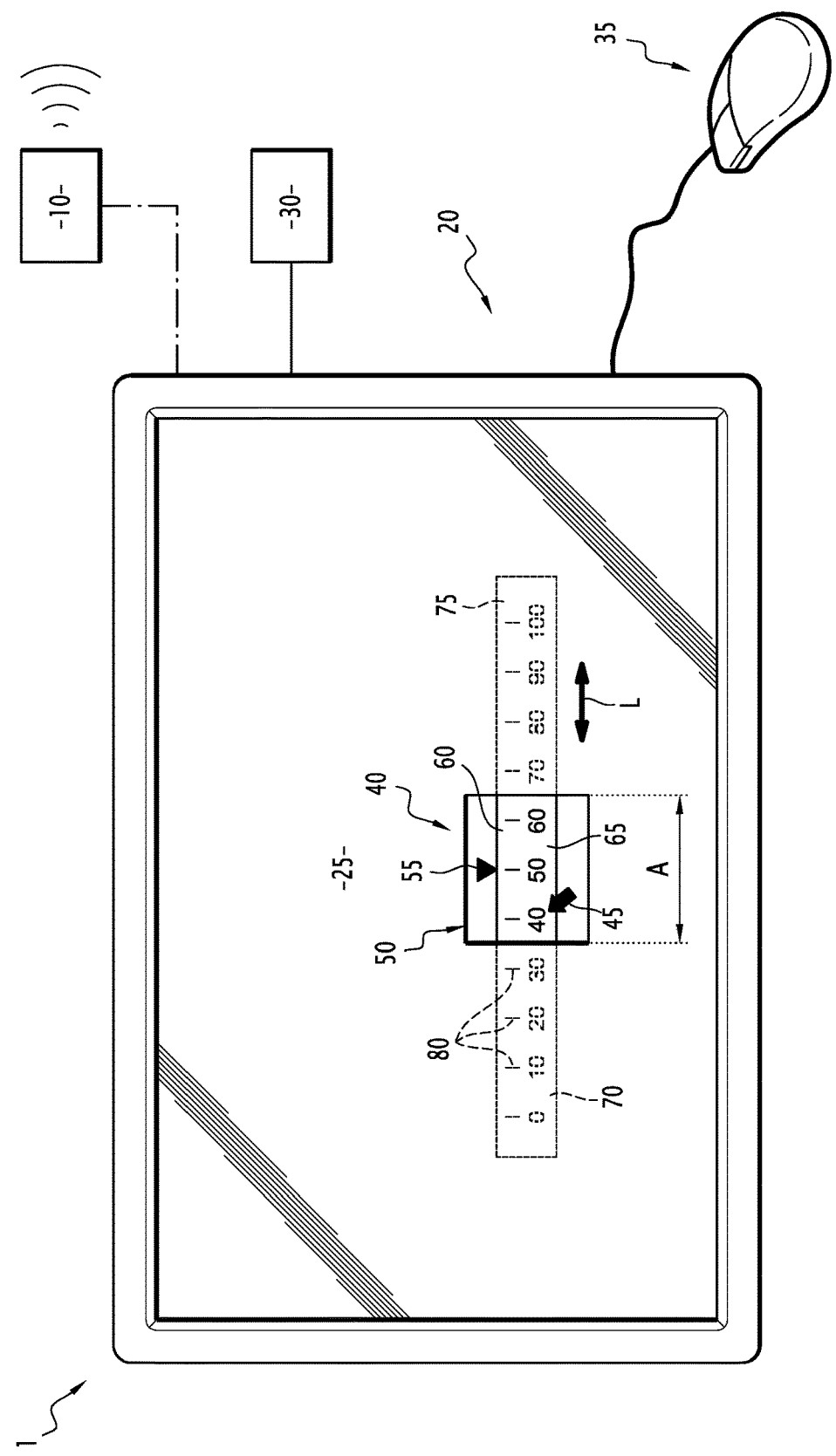

METHOD FOR CONTROLLING AN OPERATING PARAMETER OF AN ACOUSTIC APPARATUS

CROSS-REFERENCES TO RELATED APPLICATIONS

This application claims priority benefit under 35 U.S.C. § 371 to International Patent Application No. PCT/EP2015/080098 entitled METHOD FOR CONTROLLING AN OPERATING PARAMETER OF AN ACOUSTIC APPARATUS, and filed by inventors Charles Coqueret, Maxime Leblanc and Pierre-Emmanuel Calmel on Dec. 16, 2015. International Patent Application No. PCT/EP2015/080098 claims priority to French Patent Application No. 14 62519, filed by inventors Charles Coqueret, Maxime Leblanc and Pierre-Emmanuel Calmel on Dec. 16, 2014.

FIELD OF THE INVENTION

The present invention relates to a method for controlling an operating parameter of an acoustic apparatus comprising at least the following steps:
implementing a screen displaying at least one window including a cursor able to occupy a plurality of positions relative to a reference of the window, the positions of the cursor respectively representing a plurality of values of the operating parameter extending between a minimal value and a maximal value,
displaying the cursor in an initial position relative to the reference representative of an initial value of the operating parameter,
acquiring an elementary command from an operator,
moving the cursor with respect to the reference as a function of the acquired elementary command, from the initial position to a final position in order to select a final value of the operating parameter in a range of selected values containing the initial value, and
sending the selected final value to the acoustic apparatus.

The method in particular is suitable for controlling a gain parameter representative of an audio volume, the acoustic apparatus for example being a speaker or an amplifier.

BACKGROUND OF THE INVENTION

To modify the audio volume emitted by a personal computer, it is known, for example, to display a window on the screen of the computer, the window showing a cursor able to be moved relative to a scale, which may or may not be graduated, of the window. The initial position of the cursor relative to the scale represents the audio volume of the computer. To modify the audio volume, a user, for example using a mouse, clicks on the cursor and moves it along the scale. The final position of the cursor relative to the scale provides a value of the audio volume that the computer interprets as a new adjustment.

The volume is thus easily adjustable between a minimum value and a maximum value, for example between 0 and 100.

However, there is a risk of the operator moving the volume from 0 to 100 without having actually wished to do so. In other words, such a method for controlling the volume has the drawback that the operator can accidentally set the acoustic apparatus to its full volume, with all of the negative consequences related to an excessively loud audio volume.

BRIEF SUMMARY OF THE INVENTION

One aim of the invention is therefore to propose a control method as described above, that both is practical and limits the risk of the operator switching from the minimum value to the maximum value of the operating parameter unintentionally.

To that end, the invention relates to a control method in which the range of selectable values has an amplitude strictly less than the difference between the maximum value and the minimum value.

According to specific embodiments, the method includes one or more of the following features, considered alone or according to any technically possible combination(s):
the range of selectable values has an amplitude strictly less than the quotient of the difference between the maximum value and the minimum value by a value chosen from among 1.5, 2, 3, 4 and 5.
the operating parameter is a gain parameter representative of an audio volume of the acoustic apparatus;
the elementary command is a sliding of the finger on a touchscreen, or a mouse click and movement;
the cursor is movable relative to the window in a movement direction parallel to the screen and has an elongate shape along the movement direction, the cursor having, irrespective of the position of the cursor relative to the reference taken from said plurality, a part situated inside the window, and at least one part situated outside the window on the screen, the part situated outside the window preferably not being displayed on the screen;
the cursor is a graduated strip, including graduations, preferably regularly spaced apart, extending from the minimum value to the maximum value, the graduations being partially situated in the window, and the graduations situated outside the window preferably not being displayed;
the acquisition of the elementary command comprises a sub-step for the movement of a pointer by the operator in the window, the movement of the cursor being done as a function of the movement of the pointer;
in the sub-step for movement of a pointer, a speed parameter of the pointer is obtained, the speed parameter being representative of a speed of the pointer projected over the movement direction, the movement of the cursor comprising at least a first phase in which the cursor is moved relative to the reference of the window in the movement direction at a speed substantially equal to the speed parameter of the pointer if the speed parameter is above a predetermined threshold, or at a speed strictly lower than the speed parameter if the speed parameter is less than or equal to the predetermined threshold; and
in the sub-step for movement of the pointer, one tests whether the pointer encounters an edge of the window and, if yes, in the step for movement of the cursor, the movement of the cursor comprises a second phase during which the movement speed of the cursor along the movement direction goes to zero and remains zero until the selected final value is transmitted to the acoustic apparatus, the second phase immediately following the first phase.

The invention also relates to a system for controlling an operating parameter of an acoustic apparatus, the system comprising a screen suitable for displaying at least one window including a cursor able to occupy a plurality of positions relative to a reference of the window, the positions of the cursor respectively representing a plurality of values of the parameter extending between a minimum value and a maximum value, the system being able to:

display the cursor in an initial position relative to the reference representative of an initial value of the operating parameter, acquire an elementary command from an operator, move the cursor with respect to the reference as a function of the acquired elementary command, from the initial position to a final position in order to select a final value of the operating parameter in a range of selected values containing the initial value, and send the selected final value to the acoustic apparatus, wherein the system is configured so that the range of selectable values has an amplitude strictly less than the difference between the maximum value and the minimum value.

BRIEF DESCRIPTION OF THE SEVERAL VIEWS OF THE DRAWING

The invention will be better understood upon reading the following description, provided solely as an example, and done in reference to the appended FIGURE, which is a schematic illustration of a system according to the invention.

DETAILED DESCRIPTION OF THE INVENTION

In reference to the sole FIGURE, an assembly 1 is described of an acoustic apparatus 10 and a system 20 for controlling an operating parameter of the acoustic apparatus 10.

The acoustic apparatus 10 is for example a speaker, an amplifier, or one or several speakers connected to an amplifier.

Alternatively, the acoustic apparatus 10 is a microphone.

The operating parameter is advantageously a gain parameter representative of an audio volume of the acoustic apparatus 10. The operating parameter assumes values between a minimum value, for example "0", and a maximum value, for example "100".

Depending on the type of acoustic apparatus 10, the operating parameter may assume all values comprised between the minimum value and the maximum value, or discrete values. In this last case, the discrete values are for example separated by a constant interval characteristic of the acoustic apparatus 10.

The system 20 comprises a screen 25, a central processing unit 30, and for example a mouse 35.

The system 20 is for example a computer, advantageously portable, a touch-sensitive tablet, or a smartphone.

The screen 25 is suitable for displaying a window 40, and a pointer 45, for example in the form of an arrow, as shown in the FIGURE.

The window 40 includes an edge 50, for example rectangular, a reference 55 that is stationary relative to the edge 50, and a cursor 60 able to occupy a plurality of positions (one of which is shown in the FIGURE) relative to the reference 55.

The cursor 60 is movable relative to the window 40 along a movement direction L advantageously parallel to the screen 25. The positions of the cursor 60 are respectively representative of a plurality of values of the operating parameter of the acoustic apparatus 10, for example the position of the cursor 60 shown in the FIGURE is representative of the value "50" of the operating parameter.

The cursor 60 includes a part 65 situated inside the window 40, and two parts 70, 75 situated outside the window in the position of the cursor shown in the FIGURE.

In other positions of the cursor 60 relative to the window 40 (not shown), the cursor includes only one part situated outside the window.

In the illustrated example, the cursor 60 is a graduated strip elongated along the movement direction L.

The cursor 60 for example comprises graduations 80 regularly spaced apart along the movement direction L and going from the minimum value to the maximum value, therefore in the example from "0" to "100".

Preferably, the part(s) 70, 75 of the cursor 60 situated outside the window 40 are not displayed on the screen 25.

According to one particular embodiment, the graduations 80 of the part 65 that are remote with respect to the reference 55 along the movement direction L are displayed less intensely, or blurry, compared to the graduations 80 closer to the reference 55.

The central processing unit 30 is connected to the screen 25. The central processing unit 30 is suitable for controlling what is displayed on the screen.

The mouse 35 is functionally connected to the central processing unit 30. The mouse 35 is suitable for moving the pointer 45 inside the window 40.

The part 65 of the cursor 60 situated inside the window 40 has an amplitude A along the movement direction L. In the illustrated example, the amplitude A extends approximately from the "35" graduation to approximately the "65" graduation. The amplitude A is strictly less than the quotient of the difference between the maximum value and the minimum value divided by three.

According to alternatives that are not illustrated, the amplitude A is strictly less than the quotient of the difference between the maximum value and the minimum value divided by two, four or five, or by 1.5.

The operation of the assembly 1 will now be described.

During operation, the system 20 implements a method for controlling the operating parameter of the acoustic apparatus 10.

The method comprises the following steps:
implementation of the screen 25,
display of the cursor 60 in an initial position (shown in the FIGURE) relative to the reference 55 of the window 40,
acquisition of an elementary command done by an operator (not shown),
movement of the cursor 60 with respect to the window 40, as a function of the acquired elementary command, from an initial position representative of an initial value of the operating parameter, to a final position (not shown) to select a final value of the operating parameter, of which the final position is representative, and
sending of the selected final value to the acoustic apparatus 10.

In the illustrated example, the initial value is indicated by reference 55 among the graduations 80 of the cursor 60. In the example, the initial value of the operating parameter is therefore "50".

Alternatively (not shown), the initial value could have any value comprised between the minimum value and the maximum value.

During operation, the central processing unit 30 ensures that the cursor 60 does not go beyond the two extreme positions (not shown) respectively representative of the minimum value and the maximum value of the operating parameter. In other words, the movements of the cursor 60 are limited along the movement direction L so that the reference 55 is not found beyond the "100" graduation or below the "0" graduation.

In the illustrated example, the elementary command therefore consists of a click by the mouse 35 and a movement of the mouse. The click makes it possible to grab the cursor 60 using the pointer 45 and the movement of the mouse 35 makes it possible to initiate a movement of the cursor 60 relative to the reference 55 along the movement direction L.

Alternatively, the system 20 comprises a screen 25 of the touch-sensitive type, the pointer 45 is replaced by a contact by the operator's finger with the screen, and the movement of the mouse 35 is replaced by sliding of the finger on the screen.

The possible movements of the cursor 60 as a function of the elementary command from the operator determine a range of selectable values for the operating parameter.

Irrespective of the elementary command, the consecutive movement of the cursor 60 is limited in amplitude along the movement direction L so that the range of selectable values is limited.

According to one embodiment, the movement of the cursor 60 is done at the same speed as the movement of the pointer 45 along the movement direction L as long as the pointer 45 does not encounter the edge 50 of the window 40.

When the pointer 45 encounters the edge 50, the movement of the cursor 60 relative to the window 40 is interrupted. This limits the amplitude of the range of selectable values.

In the illustrated example, all of the values of the operating parameter corresponding to the graduations of the cursor 60 contained in the window 40 are selectable.

The range of selectable values has, in the example, the amplitude A shown in the FIGURE. The range of selectable values contains the initial value (in the example, "50") and extends on both sides up to the value "65" and up to the value "35".

The movement of the cursor 60 obtained by the elementary command comprises, in the illustrated example, a first phase in which the cursor moves at a speed substantially equal to the speed of the pointer relative to the movement direction L. If the pointer 45 encounters the edge 50 of the window 40, the movement of the cursor 60 comprises a second phase during which the movement speed of the cursor 60 goes to zero and remains zero until the final value selected by the final position of the cursor 60 is transmitted to the acoustic apparatus 10.

The second phase immediately follows the first phase and corresponds to an immobilization, instantaneous in the example, of the cursor 60 relative to the window 40.

According to other specific embodiments, the cursor 60 has a movement speed profile relative to the movement direction L different from that described above.

For example, during the second movement phase of the cursor 60, the speed of the cursor decreases more slowly, advantageously going to zero in less than 300 ms, preferably in less than 100 ms.

For example, during the first phase of the movement of the cursor 60, if the speed of the pointer 45 is strictly below a predetermined threshold, the cursor 60 is moved at a speed strictly lower than that of the pointer 45, so as to obtain a more minute adjustment of the selected final value.

The commonality between all of the possible embodiments of the first phase and the second phase of the movement of the cursor 60 in response to the elementary command from the operator is that the range of final positions achievable by the cursor is limited such that the range of selectable values has an amplitude strictly smaller than the difference between the maximum value and the minimum value.

Owing to the features described above, if the initial value of the operating parameter is "0", the final value being contained in the range of selectable values, the final value is necessarily strictly less than the maximum value. Thus, it is not possible for the operating parameter to go from the minimum value to the maximum value due to the elementary command from the operator. In simpler terms, the operator is required to perform at least two, or even more, elementary commands to go from 0 to 100. The number of elementary commands to be performed is even higher when the range of selectable values is reduced relative to the difference between the maximum value and the minimum value.

Furthermore, the optional feature according to which the cursor 60 is moved at a speed slower than that of the pointer 45 and the movement direction L if the pointer 45 itself is moved at a speed below a given threshold allows a very fine adjustment of the operating parameter.

Since the operator must perform at least two elementary gestures to go from the minimum value to the maximum value, the risk of him doing so unintentionally is limited.

The invention claimed is:

1. A method for controlling an operating parameter of an acoustic apparatus, the method comprising:
   implementing a screen displaying at least one window, the at least one window including at least a portion of a cursor able to occupy a plurality of positions relative to a fixed reference of the at least one window, each cursor position (i) representing a current selectable value of an operating parameter, and (ii) defining a respective range of selectable values of the operating parameter, the range of selectable values having an amplitude strictly less than the difference between a maximum value and a minimum value of the operating parameter;
   displaying the cursor in an initial position relative to the fixed reference, alignment of the fixed reference relative to the cursor representing an initial selected value of the operating parameter;
   acquiring an elementary command from an operator, the operator moving a pointer in the at least one window;
   obtaining a speed parameter of the pointer, the speed parameter being representative of a speed of the pointer projected over the direction of movement of the cursor;
   sliding the cursor with respect to the fixed reference, in a direction of movement along the cursor, at a speed equal to the speed parameter of the pointer if the speed parameter of the pointer is above a predetermined threshold, or at a speed lower than the speed parameter of the pointer if the speed parameter of the pointer is less than or equal to the predetermined threshold, from the initial position to a final position in order to select a final selected value of the operating parameter, wherein sliding of the cursor is constrained to prevent the final selected value from being outside of the range of selectable values defined by the initial position of the cursor; and
   sending the final selected value of the operating parameter to the acoustic apparatus.

2. The method according to claim 1, wherein the range of selectable values has an amplitude strictly less than the quotient of the difference between the maximum value and the minimum value of the operating parameter by a value chosen from among 1.5, 2, 3, 4 and 5.

3. The method according to claim 1, wherein the operating parameter is a gain parameter representative of an audio volume of the acoustic apparatus.

4. The method according to 1, wherein moving the pointer comprises sliding a finger on a touchscreen, or pressing and moving a mouse.

5. The method according to claim 1, wherein the cursor has an elongate shape along the movement direction of the cursor, the cursor having, irrespective of the position of the cursor relative to the fixed reference, a part situated inside the at least one window, and at least one part situated outside the at least one window.

6. The method according to claim 5, wherein the part of the cursor situated outside the at least one window is not displayed on the screen.

7. The method according to claim 5, wherein the cursor is a graduated strip, including graduations, extending from the minimum value to the maximum value, the graduations being partially situated in the at least one window.

8. The method according to claim 7, wherein the graduations are regularly spaced apart.

9. The method according to claim 7, wherein the graduations situated outside the at least one window are not displayed.

10. The method according to claim 1, further comprising:
    in moving the pointer, testing whether the pointer encounters an edge of the at least one window; and
    if so, sliding the cursor such that the sliding speed of the cursor along the movement direction goes to zero and remains zero until the selected final value is transmitted to the acoustic apparatus.

11. A system for controlling an operating parameter of an acoustic apparatus, the system comprising a screen suitable for displaying at least one window, the at least one window including a cursor able to occupy a plurality of positions relative to a fixed reference of the at least one window, each cursor position (i) representing a current selectable value of an operating parameter, and (ii) defining a respective range of selectable values of the operating parameter, the range of selectable values having an amplitude strictly less than the difference between a maximum value and a minimum value of the operating parameter, the system being configured to:
    display the cursor in an initial position relative to the fixed reference, alignment of the fixed reference relative to the cursor representing an initial selected value of the operating parameter;
    acquire an elementary command from an operator, the operator moving a pointer in the at least one window;
    obtain a speed parameter of the pointer, the speed parameter being representative of a speed of the pointer projected over the direction of movement of the cursor;
    slide the cursor with respect to the fixed reference, at a speed equal to the speed parameter of the pointer if the speed parameter of the pointer is above a predetermined threshold, or at a speed lower than the speed parameter of the pointer if the speed parameter of the pointer is less than or equal to the predetermined threshold, from the initial position to a final position in order to select a final selected value of the operating parameter, wherein sliding of the cursor is constrained to prevent the final selected value from being outside of the range of selectable values defined by the initial position of the cursor; and
    send the final selected value of the operating parameter to the acoustic apparatus.

* * * * *